Jan. 4, 1944.     H. N. FAIRBANKS     2,338,628
FOCAL PLANE SHUTTER CONTROL
Filed June 22, 1942     2 Sheets-Sheet 1

HENRY N. FAIRBANKS
INVENTOR

BY
ATTORNEYS

Jan. 4, 1944. H. N. FAIRBANKS 2,338,628
FOCAL PLANE SHUTTER CONTROL
Filed June 22, 1942 2 Sheets-Sheet 2

HENRY N. FAIRBANKS
INVENTOR
BY
ATTORNEYS

Patented Jan. 4, 1944

2,338,628

UNITED STATES PATENT OFFICE 2,338,628

FOCAL PLANE SHUTTER CONTROL

Henry N. Fairbanks, Rochester, N. Y., assignor to Eastman Kodak Company, Rochester, N. Y., a corporation of New Jersey Application June 22, 1942, Serial No. 447,988

13 Claims. (Cl. 95—57)

This invention relates to photography and particularly to curtain shutters for photographic cameras. One of the objects of my invention is to provide a curtain shutter with which a wide variety of exposures can be obtained. Another object of my invention is to provide a shutter of the type described with a comparatively simple control mechanism with which exposures which can be accurately repeated can be readily made. Another object of my invention is to provide a shutter of the type including two curtains with a mechanism for accurately releasing a second shutter after a first shutter has started to move so that a slot formed by the edges of the two shutters will form an exposure slot through which light rays may pass to make an exposure. Other objects will appear from the following specification, the novel features being particularly pointed out in the claims at the end thereof.

In the past there have been many focal plane shutters utilizing two curtains which are usually latched together with a slot of predetermined width between the two curtains so that they may be released and run across the exposure frame of a camera to make an exposure. Thus, after the two curtains are latched together they move as a single curtain. Focal plane shutters have also been known to consist of two separate curtains, one of which is released in advance of the other after which movement of the first curtain releases the second curtain which will then follow the first curtain but which, nevertheless, moves independently thereof. It is to this second class of focal plane shutters that my present invention is directed and it is particularly directed to the control mechanism by which the first curtain releases the second curtain.

Coming now to the drawings wherein like reference characters denote like parts throughout:

My present control is applied to a focal plane shutter of the type including two curtains, a leader curtain and a follower curtain, in which each of the curtains is attached to its own individual spring operated roller. Mechanism is provided for releasing the leader curtain which starts to move and trips a follower curtain after a predetermined interval which determines the width of a slot through which an exposure may be made.

Figure 2:
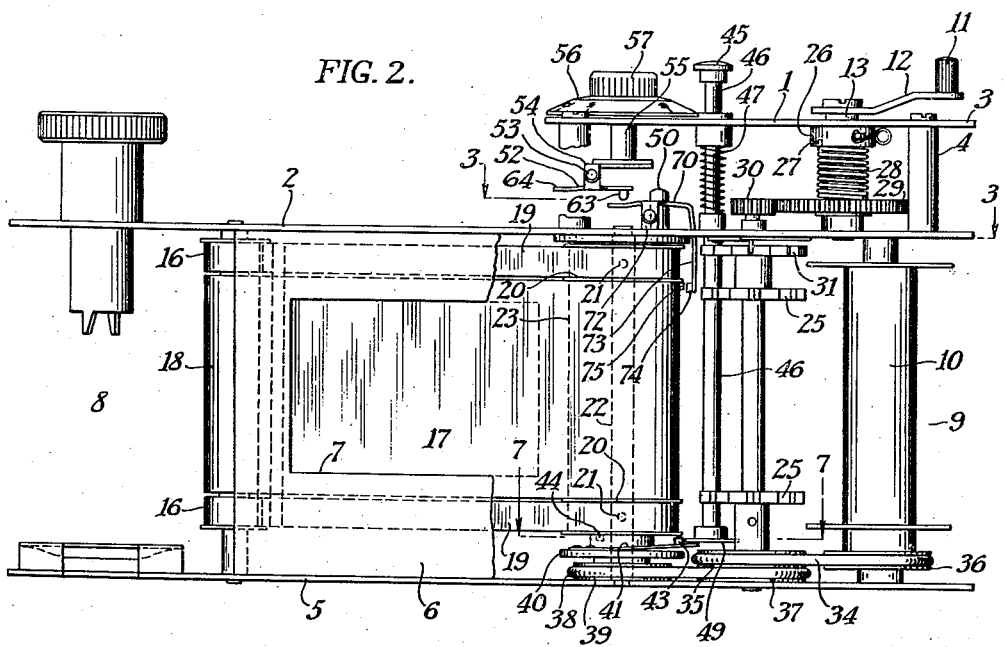
Fig. 2 is a focal plane mechanism removed from a camera body showing the focal plane mechanism and shutter in elevation.

More specifically, my invention may consist of a shutter mechanism shown in Fig. 2 and referred to broadly by the numeral 1. This mechanism may consist of a main mechanism plate 2 and an upper plate 3 which may be joined together by posts 4 so that the control mechanism can be largely positioned between these two plates. There is a lower plate 5 similar to plate 2, this plate supporting a frame 6 cut out at 7 to form an exposure frame. Film may pass across this frame from a spool chamber 8 at one end of the exposure frame to a spool chamber 9 in which a spool 10 is rotatably mounted, this spool being adapted to turn when an operating handle 11 carried by a crank 12 on the outside of the camera is turned to turn a shaft 13 as will be hereinafter more fully described.

Between the plates 2 and 5 are mounted a pair of spring actuated rollers 14 and 15, the former carrying tapes 16 attached to the follower curtain 17 and the latter carrying the end of the leader curtain 18 to which the tapes 19 are attached.

The leader curtain 18 is attached to tapes 19 which are supported by a pair of spaced spools 20, these spools being pinned at 21 to a shaft 22 revolubly supported by the plates 2 and 5.

The follower curtain 17 is supported by the drum member 23 which is mounted to turn freely on the shaft 22. Thus, the ends of the two curtains are carried on the drum 23 and spools 20 which are coaxial and the opposite ends of the curtains are carried by their individual spring rollers 14 and 15. These rollers, the drum 23, and the spools 20 constitute the curtain supports.

Figure 1:
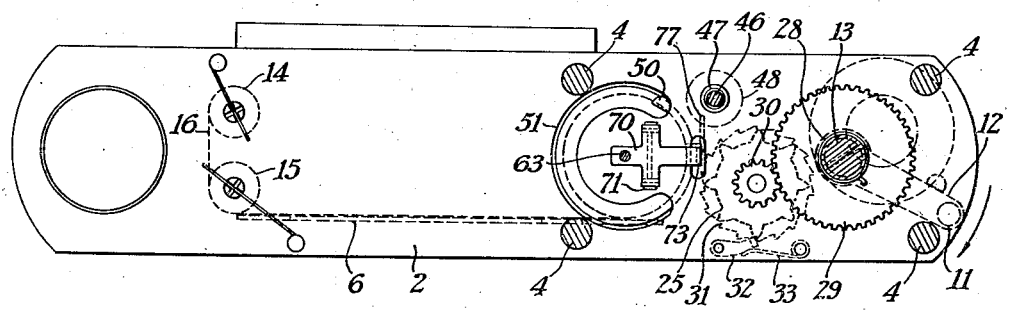
Fig. 1 is a fragmentary top plan view partially in section showing a portion of a focal plane shutter mechanism plate and parts of a focal plane shutter.
Figure 3:
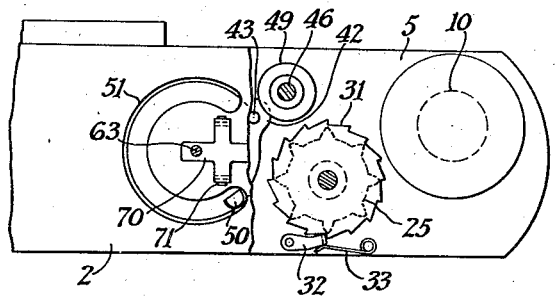
Fig. 3 is a fragmentary sectional view taken on line 3—3 of Fig. 2, certain parts being omitted for the sake of clearness.
Figure 7:
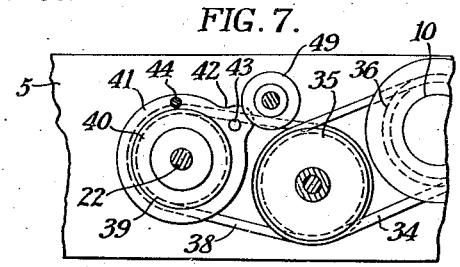
Fig. 7 is a fragmentary sectional view with parts omitted taken on line 7—7 of Fig. 2.
Figure 4:
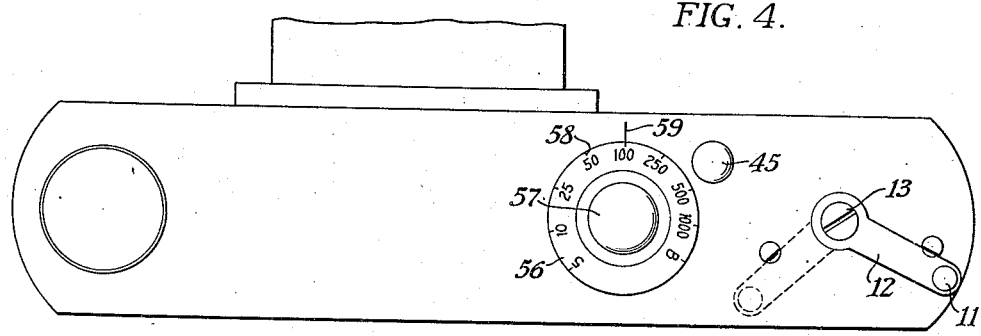
Fig. 4 is a top plan view of a camera including my improved focal plane shutter mechanism showing the camera controls outside of the camera body.
Figure 5:
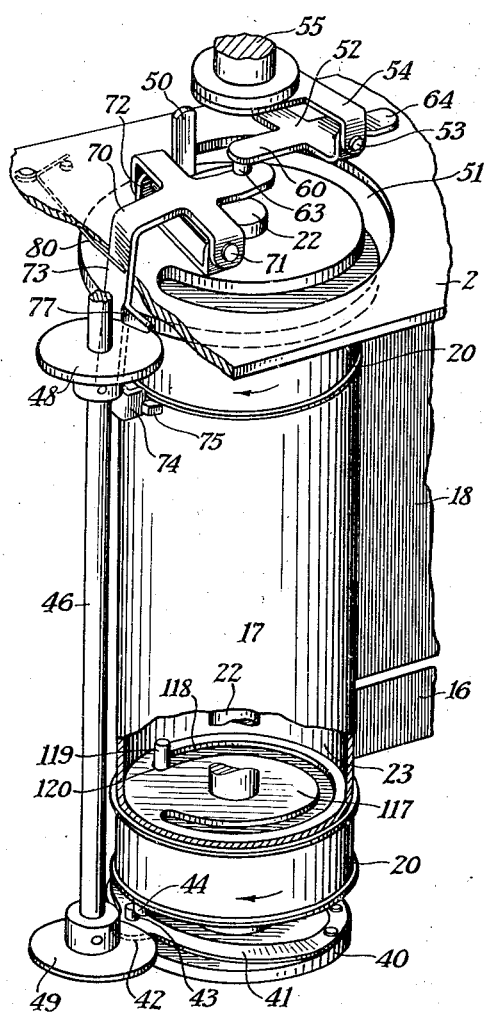
Fig. 5 is an enlarged fragmentary perspective view of the curtain controls in a position in which the shutters may be released to make an exposure.
Figure 6:
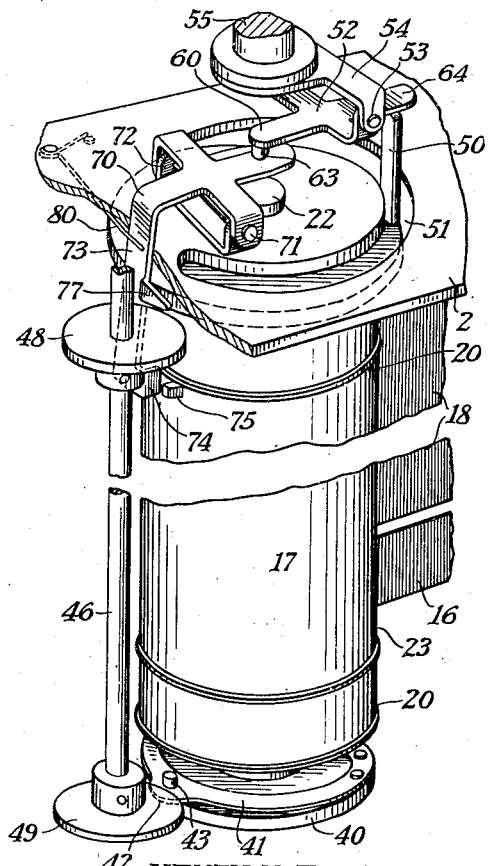
Fig. 6 is a view similar to Fig. 5 but with the leader curtain partially run down and about to trip the follower curtain.

In order to wind film from the spool chamber 8 upon the spool 10, the film which is perforated is passed over the sprocket wheels 25 after having been attached to the spool 10. The handle 11 may be swung so as to turn the one-way clutch formed by the collar 26 which carries one end 27 of a coil spring 28 which is compressed upon a shaft carrying the gear 29 when the handle 11 is swung to the left with reference to Figs. 1 and 2 or in the direction indicated by the arrow in Fig. 1. Movement of gear 29 causes gear 30 to move, this gear being provided with a ratchet 31 and pawl 32 pressed by a spring 33 against the ratchet wheel to permit movement only in a counter-clockwise direction with respect to Fig. 3. Thus, when the handle 11 is moved the sprocket wheels 25 will turn and propel film toward the spool 10. Since a spring belt 34 connects an upper pulley wheel 35 movable with the sprocket wheels 25 to a pulley 36 which turns the film spool 10, film will be wound on this spool. At the same time the film is wound a lower pulley 37, through a spring belt 38 connected to a pulley 39 carried by a disc 40 which may turn freely on the shaft 22, transmits power to this disc 40 which constitutes a means for winding up the shutter curtains. Referring to Figs. 5 and 6, it will be noticed that the disc 40 carries a spring washer 41 having an outwardly extending lug 42 from which a pin 43 extends upwardly and when the parts are in the position shown in Fig. 5, this pin may contact with a downwardly extending pin 44 carried by a spool 20 here shown as the lower spool, the upper and lower spools 20 both being pinned at 21 to the shaft 22 so as to turn together. In this position the shutter is wound up.

To make an exposure, a shutter trigger 45 carried by a rod 46 is pressed downwardly against the action of the spring 47 so that two flanges, an upper flange 48 and a lower flange 49, both affixed to the shaft 46, will be moved in unison. The lower flange 49 engages the lug 42 on the spring 41, moving the pin 43 out of the path of the pin 44 and permitting the spools 20 to turn in the direction shown by the arrows in Fig. 5. Thus, the leader curtain starts to unroll. As it unrolls an upstanding pin 50 carried by a spool 20, here shown as the upper spool, passes through an arcuate path and through an arcuate slot 51 as the shutter moves. It is this pin that is used to trip the second shutter in the following manner.

A lever 52 is pivotally mounted at 53 to a bracket 54 which is carried by a post 55 passing through the upper mechanism plate 3 and terminating in a dial 56 which may be operated by a knob 57 so that a graduation 58 will indicate, when brought opposite a pointer 59, the setting of the shutter speed which, of course, includes the positioning of the lever 52.

The lever 52 has one end 60 which lies axially of the shaft 22 and consequently of the spools 20 and drum 23. Thus, regardless of the position of the knob 57, the end 60 of the lever 52 remains in its axial position with a pin 63 projecting downwardly. The opposite end 64 of this lever extends radially from the axial end 60 and lies across the path of the pin 50, so that as this pin rotates it strikes lever end 64 rocking the pin 63, thereby rocking a second lever 70 pivoted at 71 to a bracket 72 carried by the mechanism plate 2. This lever has a downwardly extending arm 73 with an inwardly extending lug 74 which may lie in the path of a pin 75 carried by the drum 23. Thus, if it is in the path of this lug, as indicated in Fig. 5, it is rocked from this position as above described as soon as the pin 50 strikes the lever 52 thereby permitting the second curtain to follow the first. This second or follower curtain follows the first at a time determined by the position of the lever 52 and the point on which this lever 52 is rocked by the pin 50 striking the lever as it swings through its arcuate path.

The lever 70 has still another projection from the arm 73, that is a lug 77 which projects into the path of the upper disc 48 carried by the rod 46. When this rod is in its normal or raised position as shown in Fig. 2, disc 48 contacts with lug 77 and holds the end of the inwardly turned lug 74 in an inoperative position out of the path of the pin 75. Thus, when an exposure has been made and when the handle 11 is turned, the latch mechanism 43, 44 will turn both the drum 23 and the spools 20 together in a counterclockwise direction to wind both curtains to a set position. Since this winding movement turns the disc 40, the pin 43, and the pin 44 together they will remain in the set position until the trigger 45 is depressed pulling the pin 43 from the path of the pin 44.

However, as the trigger 45 is depressed the upper disc 48 moves out of the path of the lug 77 permitting the spring 80 to move the lug 74 into the path of the pin 75. The distance between the upper and lower discs 48 and 49 is such that the pin 75 will be caught by the lever 70 before the pin 43 is removed from the path of the pin 44. Thus, the lever 70 will be in an operative position ready to be rendered inoperative as soon as the upwardly extending pin rocks lever 52 and with it lever 70. It is, therefore, apparent that the speed of the exposure is determined by the setting of the lever 52 which in turn is determined by the setting of the dial 58.

It is possible to turn the dial 58 in either direction and at any time whether the shutter is set or whether it has just run down. It is also possible to turn the dial 57 to a position in which the end 64 of the lever will not lie in the path of the pin 50 as it passes through the arcuate slot 51 and when in this position the first shutter may completely run down before the second shutter follows. When this occurs, lug 74 will not be moved from the path of pin 75 to release the second curtain, and consequently the second curtain is only released when the trigger member 75 is permitted to move upwardly under the impulse of spring 47. This gives what is commonly known as a bulb exposure—that is the shutter opens when the trigger 45 is depressed and the shutter closes when the trigger 45 is released. The duration of such an exposure is determined by the time that the trigger is held down.

In order to connect the drum member 23 to the spools 20 for rewinding, it is desirable to have a lost motion connection between these parts as indicated in Fig. 5. From this figure it will be noticed that the drum 23 is provided with an integral bottom wall 117 which is provided with an arcuate slot 118 of such a length that the pin and slot permit the leader curtain to move to uncover the exposure frame 7 before the follower curtain has moved. However, when the follower curtain has moved to close the exposure aperture 7 a pin 119 extending from a spool 20 up through the arcuate slot 118 engages the end 120 of this slot so that when the clutch members 43, 44 turn the spool 20 for rewinding the curtains, since the pin 119 is in contact with the end 120 of the slot 118, these parts move together in a counter-clockwise direction until the set position shown in Fig. 5 is reached.

When the rod 46 is depressed through the trigger 45 the clutch member 43 will be pulled out of the path of the pin 44 so that both spools 20, which as above explained are both pinned at 21 to the shaft 22, may turn together as the leader curtain starts to move. This movement, of course, will cause the pin 119 to leave the end 120 of the slot 118 the extent of movement of the pin relative to the end 120 of the slot being determined by the setting of the speed adjusting lever 52. After the spools have moved and carried the pin 119 the required distance to make an opening between the two curtains corresponding with the setting of the dial 58, the latch member 74 is removed from the path of latch 75 so that the follower curtain can move after the leader curtain. The follower curtain continues to run down until the end of the slot 120 reaches the pin 119 which comes to a stop in advance of the roller 23 and the pin 119 and the end of the slot 120 again reach a position in which they are in contact and from which they may be moved to the position shown in Fig. 5 by a subsequent rewinding operation.

It will be noted from the above description that my improved focal plane shutter includes an extremely simple type of speed control and it has the advantage among others that the dial may be set before or after an exposure and that the dial may be turned backwards or forwards regardless of the position of the shutter curtains.

The operation of making an exposure and of winding film is an extremely simple one. By turning the handle 11 one full stroke, which may be controlled by suitable stops, the one-way clutch 28 transmits motion to gear 29 which, through pinion 30, turns the sprocket wheels 25. This, through the belt 34, turns the spool 10 to wind film thereon and, through the belt 38, turns the disc 40 carrying the spring clutch member 41. Movement of this spring clutch member tensions the shutter by winding the leader and follower curtains together on the spools 20 and drum 23. When the winding movement is completed, which takes place when the pin 50 strikes the end of its arcuate slot, the lug 42 of the spring clutch 41 will lie beneath the lower disc 49, as indicated in Fig. 5. Thus, when the trigger 45 is released, the lug 42 is pressed downwardly, moving the pin 43 away from the pin 44 so that the leader curtain will run toward the exposure frame 7. As this operation takes place, the pin 50, swinging through its arcute slot 51, strikes the end 64 of lever 52, which, through pins 63, rocks lever 70 and the inwardly turned lug 74 releases pin 75 so that the follower curtain may start to move. If an arm 64 is spaced only a short distance from the initial position of pin 50 the exposure will be a short one because the leader curtain will have only moved a short distance before the follower curtain starts to move. If, on the other hand, the arm 64 is near the end of the arcuate slot 51, the leader curtain will have moved a much greater distance before the follower curtain is released so that the exposure will be much longer.

If a slow exposure or bulb exposure is desired, the lever end 64 is moved beyond the end of the slot 51, so that the lever 70 will be released when the trigger moves upwardly under the impulse of spring 47.

These operations take place very rapidly, in much less time than it takes to describe, since the operation of taking a picture may consist merely of setting the knob 57 until the desired shutter speed appears opposite the pointer 59 and depressing the trigger 45. This makes the required exposure. A single movement of lever 11 simultaneously winds up the film and shutter for a second exposure.

I claim:

1. In a focal plane shutter of the type including two curtains, a leader and a follower curtain, curtain supports comprising a separate spring roller carrying one end of each curtain, a pair of spools carrying tapes attached to the opposite end of one curtain, a drum carrying the opposite end of the other curtain, the combination with said curtain supports, of means for controlling the relative rotation thereof comprising a shutter setting dial and knob, a lever pivotally carried thereby and having one end positioned axially of the dial and the other end extending radially therefrom, a pin arcuately movable with one of said tape carrying spools and coaxially of the dial, said pin being adapted to pass through an arcuate path intercepting the radially extending knob lever and of a length to move said lever on its pivotal support in intercepting said lever, and means actuated by movement of the lever for releasing the follower curtain.

2. In a focal plane shutter of the type including two curtains, a leader and a follower curtain, curtain supports comprising a separate spring roller carrying one end of each curtain, a pair of spools carrying tapes attached to the opposite end of one curtain, a drum carrying the opposite end of the other curtain, the combination with said curtain supports, of means for controlling the relative rotation thereof comprising a shutter setting dial and knob, a lever pivotally carried thereby and having one end positioned axially of the dial and the other end extending radially therefrom, a pin arcuately movable with one of said tape carrying spools and coaxially of the dial, said pin being adapted to pass through an arcuate path intercepting the radially extending knob lever and of a length to move said lever on its pivotal support in intercepting said lever, and means actuated by movement of the lever for releasing the follower curtain comprising a second pivoted lever, a latch between said second lever and the follower curtain support, said second pivotal lever when rocked by the first pivoted lever releasing the follower curtain at a time determined by the position of the knob.

3. In a focal plane shutter of the type including two curtains, a leader and a follower curtain, curtain supports comprising a separate spring roller carrying one end of each curtain, a pair of spools carrying tapes attached to the opposite end of one curtain, a drum carrying the opposite end of the other curtain, the combination with said curtain supports, of means for controlling the relative rotation thereof comprising a shutter setting dial and knob, a lever pivotally carried thereby and having one end positioned axially of the dial and the other end extending radially therefrom, a pin arcuately movable with one of said tape carrying spools and coaxially of the dial, said pin being adapted to pass through an arcuate path intercepting the radially extending knob lever and of a length to move said lever on its pivotal support in intercepting said lever, and means actuated by movement of the lever for releasing the follower curtain, an operable trigger, a leader curtain latch between said trigger and a spool, said trigger being positioned to engage and trip the leader curtain latch, whereby operation of the trigger may release the leader curtain and movement of said pin through movement with said curtain may trip the follower curtain thereby making an exposure.

4. In a focal plane shutter of the type including two curtains, a leader and a follower curtain, curtain supports comprising a separate spring roller carrying one end of each curtain, a pair of spools carrying tapes attached to the opposite end of one curtain, a drum carrying the opposite end of the other curtain, the combination with said curtain supports, of means for controlling the relative rotation thereof comprising a shutter setting dial and knob, a lever pivotally carried thereby and having one end positioned axially of the dial and the other end extending radially therefrom, a pin arcuately movable with one of said tape carrying spools and coaxially with the dial, said pin being adapted to pass through an arcuate path intercepting the radially extending knob lever and of a length to move said lever on its pivotal support in intercepting said lever, and means actuated by movement of the lever for releasing the follower curtain, an operable trigger, a leader curtain latch between said trigger and a spool and including a spring washer coaxially mounted with a spool attached to the leader curtain, means on the spring washer engaging a pin carried by a first curtain spool, and a flange carried by the trigger for engaging the spring washer to release the leader curtain latch.

5. In a focal plane shutter of the type including two curtains, a leader and a follower curtain, curtain supports comprising a separate spring roller carrying one end of each curtain, a pair of spools carrying tapes attached to the opposite end of one curtain, a drum carrying the opposite end of the other curtain, the combination with said curtain supports, of means for controlling the relative rotation thereof comprising a shutter setting dial and knob, a lever pivotally carried thereby and having one end positioned axially of the dial and the other end extending radially therefrom, a pin arcuately movable with one of said tape carrying spools and coaxially of the dial, said pin being adapted to pass through an arcuate path intercepting the radially extending knob lever and of a length to move said lever on its pivotal support in intercepting said lever, and means actuated by movement of the lever for releasing the follower curtain, an operable trigger, a leader curtain latch between said trigger and a spool comprising a spring washer mounted coaxially of a spool attached to the leader curtain, a pin on said spool adapted to engage said spring washer and to be released by movement thereof, and a disk carrying said spring washer rotatably mounted coaxially of the leader curtain spool, means for turning said disk for tensioning the curtain spring rollers.

6. In a focal plane shutter of the type including two curtains, a leader and a follower curtain, curtain supports comprising a separate spring roller carrying one end of each curtain, a pair of spools carrying tapes attached to the opposite end of one curtain, a drum carrying the opposite end of the other curtain, the combination with said curtain supports, of means for controlling the relative rotation thereof comprising a shutter setting dial and knob, a lever pivotally carried thereby and having one end positioned axially of the dial and the other end extending radially therefrom, a pin arcuately movable with one of said tape carrying spools and coaxially of the dial, said pin being adapted to pass through an arcuate path intercepting the radially extending knob lever and of a length to move said lever on its pivotal support in intercepting said lever, and means actuated by movement of the lever for releasing the follower curtain, an operable trigger, a leader curtain latch between said trigger and a spool comprising a spring washer mounted coaxially of a spool attached to the leader curtain, a pin on said spool adapted to engage said spring washer and to be released by movement thereof, and a disk carrying said spring washer rotatably mounted coaxially of the leader curtain spool, a winding handle, and connection between said winding handle and disk for turning the first curtain spool through the first curtain latch and in a direction to tension the curtain spring.

7. In a focal plane shutter of the type including two curtains, a leader and a follower curtain, curtain supports comprising a separate spring roller carrying one end of each curtain, a pair of spools carrying tapes attached to the opposite end of one curtain, a drum carrying the opposite end of the other curtain, the combination with said curtain supports, of means for controlling the relative rotation thereof comprising a shutter setting dial and knob, a lever pivotally carried thereby and having one end positioned axially of the dial and the other end extending radially therefrom, a pin arcuately movable with one of said tape carrying spools and coaxially of the dial, said pin being adapted to pass through an arcuate path intercepting the radially extending knob lever and of a length to move said lever on its pivotal support in intercepting said lever, and means actuated by movement of the lever for releasing the follower curtain, an operable trigger, a leader curtain latch between said trigger and a spool comprising a spring washer coaxially mounted with the leader curtain spools, and outwardly extending lug carried by the spring washer lying in the path of the trigger when the shutter is set, means for setting the shutter by turning the disk through the first curtain latching mechanism and for moving the spring washer to release the first curtain roller by depressing the trigger.

8. In a focal plane shutter of the type including two curtains, a leader and a follower curtain, curtain supports comprising a separate spring roller carrying one end of each curtain, a pair of spools carrying tapes attached to the opposite end of one curtain, a drum carrying the opposite end of the other curtain, the combination with said curtain supports, of means for controlling the relative rotation thereof comprising a shutter setting dial and knob, a lever pivotally carried thereby and having one end positioned axially of the dial and the other end extending radially therefrom, a pin arcuately movable with one of said tape carrying spools and coaxially of the dial, said pin being adapted to pass through an arcuate path intercepting the radially extending knob lever and of a length to move said lever on its pivotal support in intercepting said lever, and means actuated by movement of the lever for releasing the follower curtain, an operable trigger, a leader curtain latch between said trigger and a spool comprising a spring washer coaxially mounted with the leader curtain spools, and outwardly extending lug carried by the spring washer lying in the path of the trigger when the shutter is set, means for setting the shutter by turning the disk through the first curtain latching mechanism, means for moving the spring washer to release the first curtain roller by depressing the trigger, said outwardly extending lug lying out of the path of the trigger at all times except when the shutter is set.

9. In a focal plane shutter of the type including two curtains, a leader and a follower curtain, curtain supports comprising a separate spring roller carrying one end of each curtain, a pair of spools carrying tapes attached to the opposite end of one curtain, a drum carrying the opposite end of the other curtain, the combination with said curtain supports, of means for controlling the relative rotation thereof comprising a shutter setting dial and knob, a lever pivotally carried thereby and having one end positioned axially of the dial and the other end extending radially therefrom, a pin arcuately movable with one of said tape carrying spools and coaxially of the dial, said pin being adapted to pass through an arcuate path intercepting the radially extending knob lever and of a length to move said lever on its pivotal support in intercepting said lever, and means actuated by movement of the lever for releasing the follower curtain, an operable trigger, a leader curtain latch between said trigger and a spool comprising a spring washer coaxially mounted with the leader curtain spools, and outwardly extending lug carried by the spring washer lying in the path of the trigger when the shutter is set, means for setting the shutter by turning the disk through the first curtain latching mechanism and for moving the spring washer to release the first curtain roller by depressing the trigger, a lug carried by the trigger and positioned to engage and to normally hold the second pivoted lever in an inoperative position, and a spring tending to move said second pivoted lever into a latching position when said trigger is moved to release the first curtain latch.

10. In a focal plane shutter of the type including two curtains, a leader and a follower curtain, curtain supports comprising a separate spring roller carrying one end of each curtain, a pair of spools carrying tapes attached to the opposite end of one curtain, a drum carrying the opposite end of the other curtain, the combination with said curtain supports, of means for controlling the relative rotation thereof comprising a shutter setting dial and knob, a lever pivotally carried thereby and having one end positioned axially of the dial and the other end extending radially therefrom, a pin arcuately movable with one of said tape carrying spools and coaxially of the dial, said pin being adapted to pass through an arcuate path intercepting the radially extending knob lever and of a length to move said lever on its pivotal support in intercepting said lever, and means actuated by movement of the lever for releasing the follower curtain, an operable trigger, a leader curtain latch between said trigger and a spool comprising a spring washer coaxially mounted with the leader curtain spools, and outwardly extending lug carried by the spring washer lying in the path of the trigger when the shutter is set, means for setting the shutter by turning the disk through the first curtain latching mechanism and for moving the spring washer to release the first curtain roller by depressing the trigger, a lug carried by the trigger and positioned to engage and to normally hold the second pivoted lever in an inoperative position, and a spring tending to move said pivoted lever into a latching position when said trigger is moved to release the first curtain latch, the position of the trigger lug for engaging the second pivoted lever being such that said lever may be released before the leader curtain latch is released upon depression of the trigger to make an exposure.

11. In a focal plane shutter of the type including two curtains, a leader and a follower curtain, curtain supports comprising a separate spring roller carrying one end of each curtain, a pair of spools carrying tapes attached to the opposite end of one curtain, a drum carrying the opposite end of the other curtain, the combination with said curtain supports, of means for controlling the relative rotation thereof comprising a shutter setting dial and knob, a lever pivotally carried thereby and having one end positioned axially of the dial and the other end extending radially therefrom, a pin arcuately movable with one of said tape carrying spools and coaxially of the dial, said pin being adapted to pass through an arcuate path intercepting the radially extending knob lever and of a length to move said lever on its pivotal support in intercepting said lever, and means actuated by movement of the lever for releasing the follower curtain, an operable trigger, a leader curtain latch between said trigger and a spool comprising a spring washer coaxially mounted with the leader curtain spools, and outwardly extending lug carried by the spring washer lying in the path of the trigger when the shutter is set, means for setting the shutter by turning the disk through the first curtain latching mechanism and for moving the spring washer to release the first curtain roller by depressing the trigger, a lug carried by the trigger and positioned to engage and to normally hold the second pivoted lever in an inoperative position, and a spring tending to move said second pivoted lever into a latching position when said trigger is moved to release the first curtain latch, the position of the trigger lug for engaging the second pivoted lever being such that said lever may be released before the leader curtain latch is released upon depression of the trigger to make an exposure, said second pivoted lever latch holding said follower curtain against movement until rocked by said pin moved through movement of the leader curtain whereby the follower curtain may be released a predetermined time after the release of the leader curtain in accordance with the setting of said knob.

12. In a focal plane shutter of the type including two curtains, a leader and a follower curtain, curtain supports comprising a separate spring roller carrying one end of each curtain, a pair of spools carrying tapes attached to the opposite end of one curtain, a drum carrying the opposite end of the other curtain, the combination with said curtain supports, of means for controlling the relative rotation thereof comprising a shutter setting dial and knob, a lever pivotally carried thereby and having one end positioned axially of the dial and the other end extending radially therefrom, a pin arcuately movable with one of said tape carrying spools and coaxially of the dial, said pin being adapted to pass through an arcuate path intercepting the radially extending knob lever and of a length to move said lever on its pivotal support in intercepting said lever, and means actuated by movement of the lever for releasing the follower curtain, an operable trigger, a leader curtain latch between said trigger and a spool comprising a spring washer coaxially mounted with the leader curtain spools, and outwardly extending lug carried by the spring washer lying in the path of the trigger when the shutter is set, means for setting the shutter by turning the disk through the first curtain latching mechanism and for moving the spring washer to release the first curtain roller by depressing the trigger, a lug carried by the trigger and positioned to engage and to normally hold the second pivoted lever in an inoperative position, and a spring tending to move said second pivoted lever into a latching position when said trigger is moved to release the first curtain latch, the position of the trigger lug for engaging the second pivoted lever being such that said lever may be released before the leader curtain latch is released upon depression of the trigger to make an exposure, a spring holding the trigger in a normal position of rest, said second pivoted lever being again moved to an inoperative position when said trigger is released to return to a normal position of rest.

13. A latch particularly adapted for use with focal plane shutters of the type in which there is a leader curtain and a follower curtain and in which one curtain is released after the other curtain, each curtain including a separate spring roller at one end, and separate rotatable members at the other end, said latch comprising a dial, a knob coaxially mounted with the said rotatable members, for moving the dial, a lever mounted on and extending radially of said knob, one end of the lever lying axially of the knob and the other end projecting substantially radially therefrom, a second pivoted lever having an arm extending substantially radially of the knob and an arm carrying a latch element extending downwardly therefrom, a spring tending to hold the latch element in a latching position with respect to one of said rotatable members carrying the follower curtain, and means carried by one of said rotatable members for the leader curtain positioned for striking the radial arm of the first lever as said rotatable member moves, whereby the substantially radially disposed arms on the first and second levers may engage rocking the second lever arm to move the latch element from its latching position.

HENRY N. FAIRBANKS.